United States Patent [19]
Keller

[11] Patent Number: 5,667,102
[45] Date of Patent: Sep. 16, 1997

[54] CARTRIDGE WITH AN EXCHANGEABLE CONTENT PACKAGE

[76] Inventor: Wilhelm A. Keller, Obstgartenweg 9, CH-6402 Merlischachen, Switzerland

[21] Appl. No.: 502,669

[22] Filed: Jul. 14, 1995

[30] Foreign Application Priority Data

Jul. 18, 1994 [EP] European Pat. Off. ............. 94810422

[51] Int. Cl.⁶ ...................................... B65D 35/28
[52] U.S. Cl. ............................... 222/95; 222/327
[58] Field of Search ................... 222/94, 95, 105, 222/137, 145.1, 145.5, 327, 386, 386.5

[56] References Cited

U.S. PATENT DOCUMENTS

| | | | |
|---|---|---|---|
| 3,066,836 | 12/1962 | Trumbull | 222/327 |
| 5,301,835 | 4/1994 | Fulks et al. | 22/105 |
| 5,332,122 | 7/1994 | Herold et al. | 222/105 |
| 5,370,271 | 12/1994 | Segatz | 222/95 |
| 5,443,181 | 8/1995 | Popp et al. | 222/327 |
| 5,443,182 | 8/1995 | Tanak et al. | 222/137 |

FOREIGN PATENT DOCUMENTS

| | | |
|---|---|---|
| 0313519 | 4/1989 | European Pat. Off. . |
| 0497739 | 8/1992 | European Pat. Off. . |
| 0541972 | 5/1993 | European Pat. Off. . |
| WO9107333 | 5/1991 | WIPO . |
| WO9316932 | 9/1993 | WIPO . |
| WO9317935 | 9/1993 | WIPO . |

*Primary Examiner*—Philippe Derakshani
*Attorney, Agent, or Firm*—Richard Linn

[57] ABSTRACT

The cartridge comprises a liner which is fastened at its outlet end to an outlet assembly which in turn is attachable to the front piece of the cartridge and which is held at its inlet end thus, that the piston slides inside the liner package. At the inlet end the liner is either fastened to the piston or to a ring insertable into the inlet end of the cartridge. Such a liner package has a low volume and plastic waste to be disposed of whereas the cylinders and the front piece of the cartridge are re-usable, whilst all performances of a rigid cartridge can be maintained or surpassed.

23 Claims, 6 Drawing Sheets

CARTRIDGE WITH AN EXCHANGEABLE CONTENT PACKAGE

BACKGROUND OF THE INVENTION

The present invention refers to a single or multiple component cartridge with an exchangeable content package.

The use of disposable cartridges for the packaging and dispensing of single component materials, such as adhesives and sealants, is well known. In order to protect the environment from such disposable, chemically contaminated cartridges and chemical waste, alternatives now exist which use the principles of a plastic or plastic/foil laminate sausage type package replaceable within the cartridge in order to repeatedly reuse cartridge components such as the cylinder and piston.

The use of disposable cartridges and mixing nozzles for the dispensing of multi-component and in particular, two-component reactive chemicals is also well established whereby they form both a package and a metering and mixing system for such materials as epoxies, polyurethanes, silicones, polysulphides and acrylics etc. The design of such metering systems incorporate two pistons within metering cylinders for the relative proportioning of each liquid component. Typical relative volumetric ratios are 1:1, 2:1, 4:1 and 10:1. The maintaining of the accuracy of such metered ratios at any point throughout the discharge of the total cartridge contents through a mixing nozzle is usually very critical.

For instance, with a 407 ml capacity system comprising two metering cylinders, one containing 370 ml of part "A" liquid and the other 37 ml of part "B" liquid, the pressurisation of the liquid within and against the total cartridge internal surface areas at up to 15 bars, must not cause any significant deflection of those surface areas to a degree so as to upset the ratio. The higher the ratio and pressure, the more sensitive this issue becomes. Any such deflection can upset the ratio during initial deflection of the cartridge surface areas at the start of pressure build-up and flow, while holding deflection during flow, and during reduction of pressure and deflection at the cessation of flow. The latter situation causing additional possible random "run on" of the liquids through the mixing nozzle after the flow should have stopped and therefore "off ratio" problems both at that time and when flow is started up again. Also, unlike single component cartridges, two-component cartridges are sensitive to air bubble trap points in their design which affect the ratio accuracy from yet another standpoint.

As with single components, there have been attempts to solve this two-component cartridge disposability problem through the use of a disposable/replaceable collapsible plastic or plastic/foil laminate package in the form of a bag or sausage within a reusable cartridge, as disclosed in PCT Application No. WO-91/07333 and European Application No. 541,972. Such packages are scraped off the wall, folded, collapsed and compacted ahead of the piston while the package membrane is being held and pressed against the cartridge wall by internal liquid pressure. Thus the greater the piston force, the greater the counter-productive force of the liquid holding the package membrane against the wall. This self-defeating force situation consumes substantial energy which, in the case of manually operated drive mechanisms, reduces the limited total amount of manual energy available and results in lower dispensing pressure and flow rates. Also, air may be entrapped within the surrounding areas of the packages within the metering cylinders and the compacting of the disposable packages is imperfect, resulting in a liquid chemical residue.

"State of the art" two-component cartridges which best fulfil the above mentioned conditions are highly rigid cartridges with substantial surface area wall thickness. However, such rigid cartridges cause a disposal problem in terms of greater contaminated plastic material waste and volumetric bulk. Therefore, because of this and a lack of cost effective product recycling, it becomes more and more necessary to package and dispense such systems in the most environmentally friendly manner possible.

SUMMARY OF THE INVENTION

It is, based on this prior art, an object of the present invention to provide for a cartridge in which the energy needed for dispensing the material is similar to that of a rigid cartridge system, where a high technical performance is maintained, and which reduces substantially the disposal problem of such systems.

This object is achieved with a single or multi component cartridge, comprising an exchangeable content package and a piston arranged in a rigid cartridge wall, wherein said exchangeable content package comprises a liner which is fastened at its outlet end to the front piece of the cartridge, said liner being held at its inlet end thus, the piston slides from the rear to the front inside the package.

The principles proposed therein are unlike the principle of collapsing and compacting sausage type film or foil laminate packages within cartridge tubes since, by the use of a liner, it is possible to reflect and preserve the well established metering performance of a conventional high performance cartridge.

BRIEF DESCRIPTION OF THE DRAWINGS

The invention will be explained in detail by way of examples with reference to the accompanying drawing.

DETAILED DESCRIPTION OF THE INVENTION

The first embodiments of the proposed invention comprise a cartridge system which considerably reduces the contamination and disposal of plastic components volume through the use of thin film plastic and plastic/foil laminates as a fully pressure supported liner against the inside of the cartridge cylinder wall within which a piston is driven and displaces the liquid content, while turning the liner "outside-in" behind the piston and pulling it with the piston towards the front of the cartridge. At the end of the piston stroke, the piston meets up with the liner front end thus completing a full displacement of the liquid content. The liner is peeled off the cartridge cylinder wall behind the piston and it's sealing means, lip or O-ring, and is therefore subject to atmospheric pressure conditions while being folded over "outside-in", without any significant loss of energy. After use, the liner assembly is disposed of, thus allowing the cartridge front part as well as the pressure supporting cylindrical part to be continually re-used.

Figure 1:
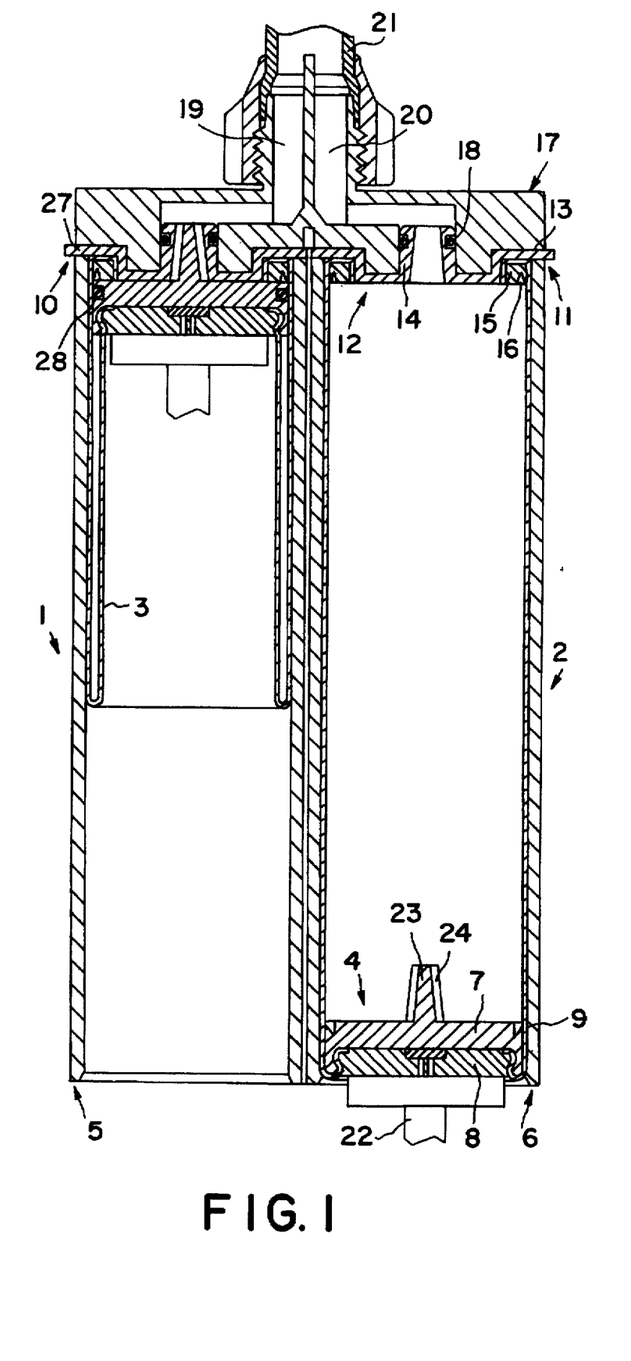
FIG. 1 shows in a longitudinal section a first embodiment of a two-component system with cartridges according to the invention with two positions of the piston.

FIG. 1 shows a first embodiment of a cartridge system having two cartridge cylinders 1 and 2 of equal or unequal diameter, according to a ratio, each containing a cylindrical thin film plastic or plastic/foil laminate liner 3, generally with a welded, hot sealed or glued seam on its longitudinal side with a piston assembly 4 attached at the open, inlet ends 5 and 6 of the respective cartridge cylinders 1 and 2. The liner can also be made of an injection moulded, blow moulded plastic or impact formed or deep drawn metal. The piston assembly comprises a piston body 7 and a securing piece 8 which attaches the liner 3 to the piston body when assembled. The front part of the piston assembly may have a lip seal 9 or an O-ring seal or a combination of both. At the outlet ends 10 and 11 of the respective cartridge cylinders, the liner 3 is secured by an outlet assembly 12 comprising an outlet piece 13 and a securing ring or piece 15 which secures the liner to the outlet piece when assembled. The securing ring 15 may have a lip seal 16. The front of the outlet piece 13 of the outlet assemblies fits into the cartridge front piece 17 and seals via an O-ring 18 or other sealing means. The front piece 17 contains the two outlet channels 19 and 20 leading into a mixing device 21.

When liquid filled liner packages are in place within the cartridge system, the dispenser driven plungers 22 drive the pistons forward while they slide within and lock the liners in place through the action of hydraulic pressure and expel the liner contents through the outlet assembly and cartridge front. At the same time the rear of the liner, behind the piston assembly, folds "outside in". Due to the seal between the piston assembly and the liner, the liner surface is wiped clean of the liquid to a high degree.

In this embodiment piston body 7 of the piston assembly 4 is provided with a conical nose 23 having ribs 24 forming channels when fitting into the conical outlet 14 of the outlet piece 13 of the liner assembly for complete discharge. As shown at the piston in cylinder 1 the piston body 7 may be provided with an O-ring 28 or the like sealing means. Finally, the piston assemblies bottom out against the liner outlet assemblies having thoroughly discharged the liner contents especially through the action of the piston nose.

Figure 2:
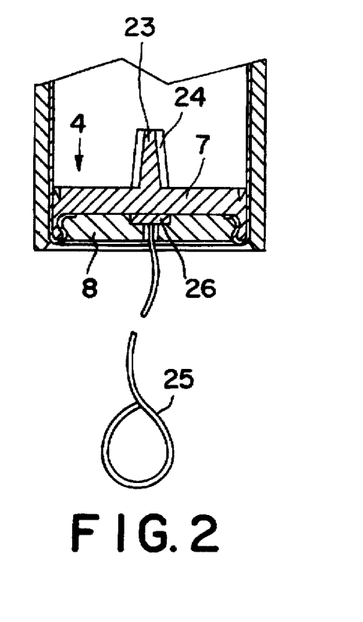
FIG. 2 shows a detail of FIG. 1.

FIG. 2 shows a pull cord 25 attached by attachment means 26 to the piston assembly 4 which enables the filled liner package to be pulled through the cylinder from the front to the back of the cylinder until the flange 27 of the outlet piece 13 meets the front end of the cylinder.

Figure 3:
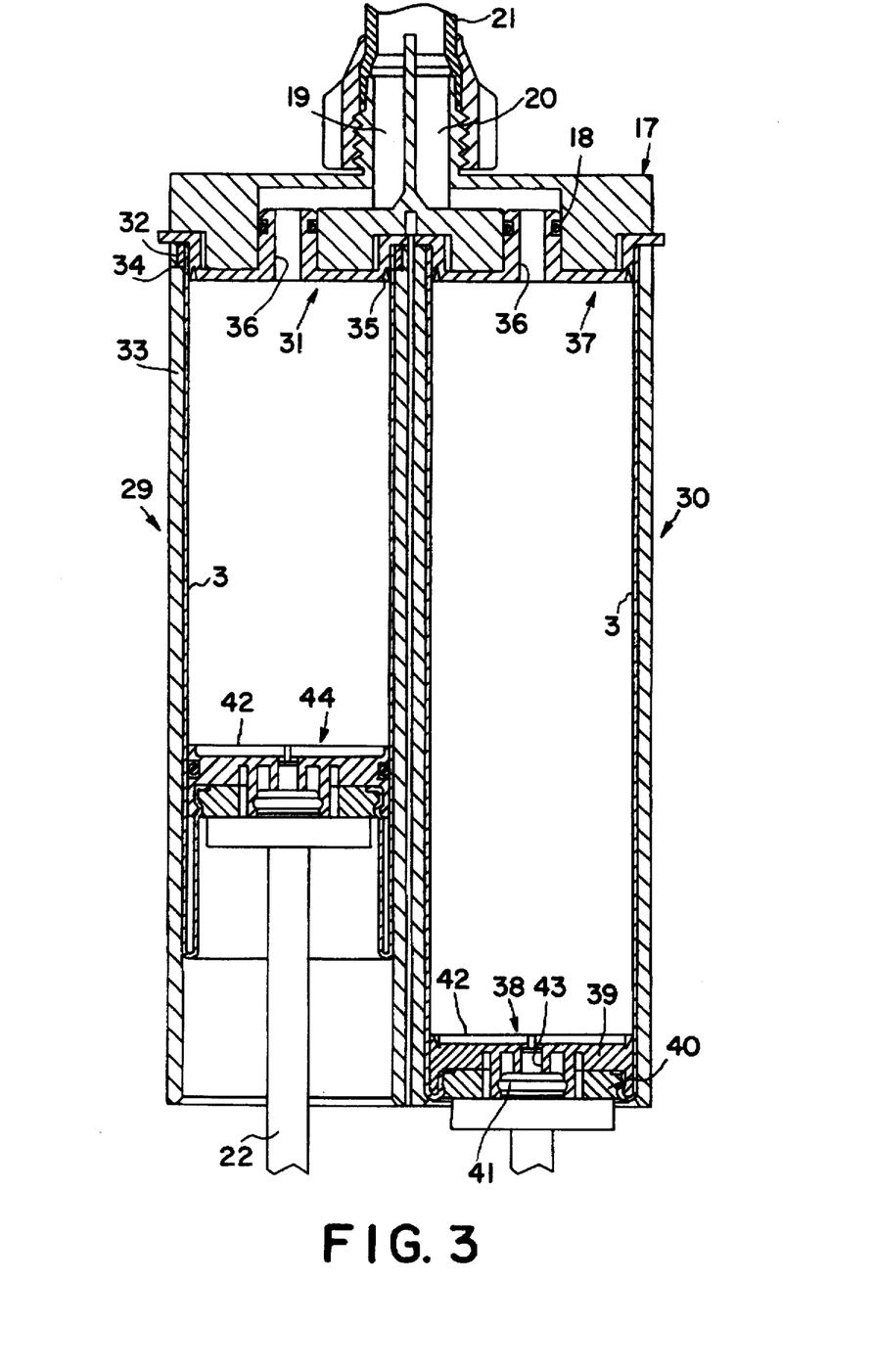
FIG. 3 shows in a longitudinal section a second embodiment of a two-component system with cartridges according to the invention with two positions of the piston.

FIG. 3 shows a second embodiment of the invention, wherein the front piece 17 of the cartridge is the same as in FIG. 1. The outlet assembly 31 is a variant of that previously shown in that liner 3 is fastened to the outlet piece 31 by a ring 32 giving a press fit and is located within a recess in the wall 33 of the cartridge cylinder 29. It is also possible to fasten the liner by welding or hot sealing or bonding or the like, as shown at outlet assembly 37 which is arranged in cartridge cylinder 30. The outlet assembly further comprises a lip seal 35.

The piston assembly 38 is also composed of a piston body 39 and a securing piece 40, fastening the liner 3. As a variation of the previous embodiment, piston assembly 38 is provided with a snap-in piston plug 41 so as to vent air through the piston after filling in the conventional way. To this purpose the piston body is provided with vent channels 42 at the face 44 of the piston body leading to a central bore 43, see for example EP-A-344 491.

Figure 4:
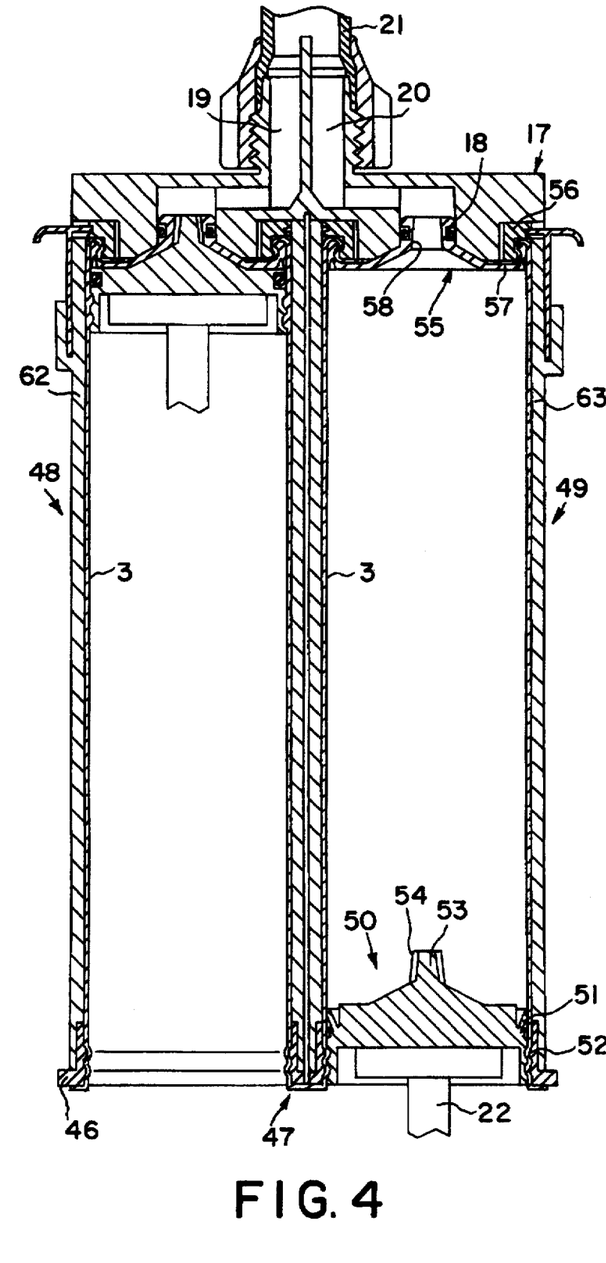
FIG. 4 shows in a longitudinal section a third embodiment of a two-component system with cartridges according to the invention with two positions of the piston.

In a third embodiment of the invention, a similar cartridge liner may be used, but which is fixed and held against the cartridge cylinder wall behind the piston before and after displacement of the liner package liquid content, and is not fixed to the piston. FIG. 4 shows this third embodiment of the invention. To this end a retaining ring 46 is attached to the outside rear of the liner 3 by welding, hot sealing or an adhesion means and sliding into a recess at the inlet end 47 of cartridge cylinder 48 or 49.

A piston 50 with a double lip 51 or the like sealing means is held within and close to the rear of the liner, as shown in cartridge 49, with securing means 52 between retaining ring and piston. Also in this embodiment piston 50 is provided with a conical nose 53 having ribs 54 forming channels when fitting into the conical outlet 58 of outlet piece 57 of the outlet assembly 55 for complete discharge.

The front piece 17 of the cartridge is similar to the front piece of the previous embodiments. At the outlet end of the cartridge the liner 3 is secured by an outlet assembly 55 comprising an outlet piece 57 and a securing ring or piece 56 which secures the liner when assembled. The front of the outlet pieces 57 of the liner assemblies fit into the cartridge front piece 17 and seal via O-ring 18 or other sealing means to this front piece and by a lip seal 59 to the liner. The cartridge front piece 17 contains the two outlet channels 19 and 20 leading into a mixing device 21.

Figure 5:
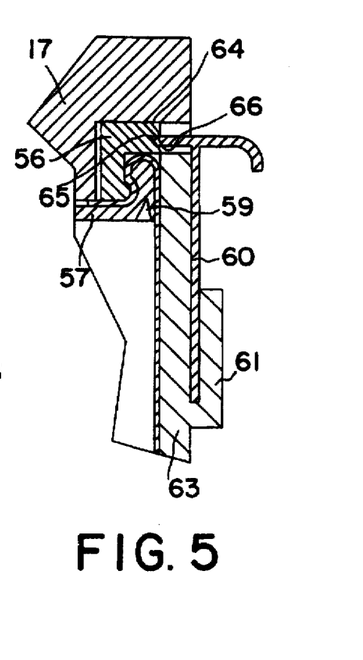
FIG. 5 shows an enlarged detail of FIG. 4.

The filled liner package is secured to the cartridge wall, for example by a spring 60 inserted into receiving means 61 provided on each of the walls 62 and 63 of the cartridge. In this example, when filled, the liner package with the outlet piece is pushed into the cartridge from the inlet end of the cartridge until the chamfered edge 64 of outlet piece 57 pushes the tip 65 of spring 60 outward whereupon the tip of the spring resiles into a groove 66 below the chamfered edge, see FIG. 5, for securing the outlet piece and with it the filled liner package to the cartridge cylinder. Other filled liner package securing means are also possible. In this embodiment liner 3 remains in place during discharge and is easily removed via the inlet end of the cartridge cylinder after its complete discharge.

Figure 6:
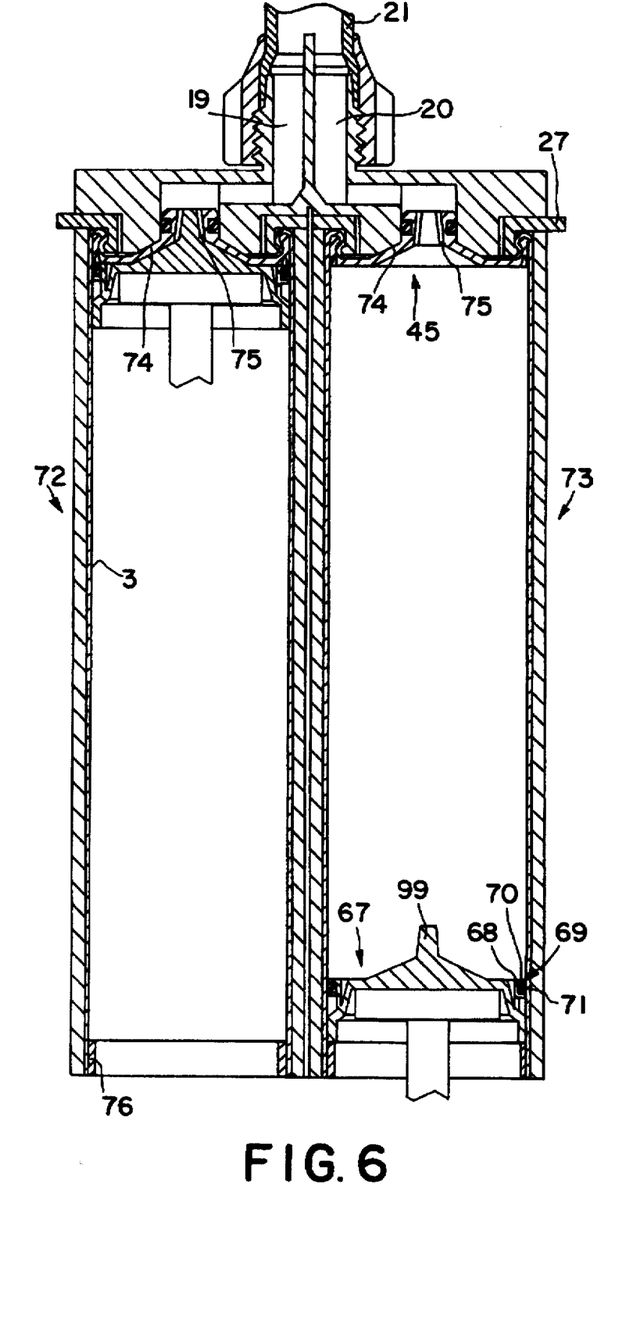
FIG. 6 shows in a longitudinal section a fourth embodiment of a two-component system with cartridges according to the invention with two positions of the piston.

FIG. 6 shows in a fourth embodiment that the liner 3 complete with the piston 67 with a sealing means 68 and 71 is held against the wall of cylinders 72 or 73 and close to the rear of the liner by an internal retaining ring 76 which is attached to the inside rear of the liner by welding, hot sealing or an adhesion means. The cartridges 72 and 73 and the liner fastening means at both ends are essentially the same as in the previous embodiment. The fastening means for the outlet assembly, however, is the same as in FIGS. 1 or 2. Also in this embodiment, liner 3 remains in place during discharge. The outlet 74 of the outlet assembly 45 in both cartridge cylinders comprise ribs 75 having the same function as the ribs at the nose of the piston, to prevent a sealing effect when the piston nose 99 moves into the outlet for complete discharge of the content material.

Figure 7:
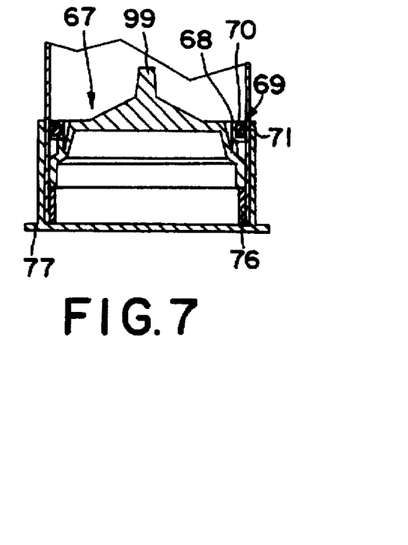
FIGS. 7 and 8 show two details of FIG. 6.
Figure 8:
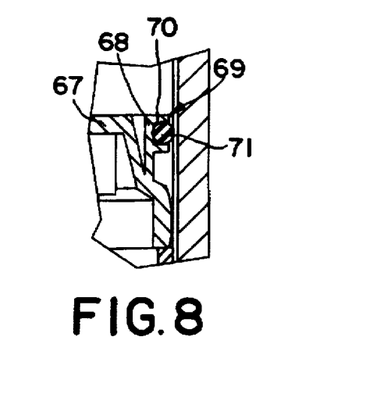

FIG. 6 and in particular FIGS. 7 and 8 show a piston design within a liner having a pressure assisted sealing device incorporating an O-ring or the like sealing means in a lip seal to minimize resistance when loading the filled liner package backwards into the cartridge cylinder from the front end side. Piston 67 has at its skirt a flexible sealing lip 68. Sealing lip 68 has a face 69 facing the liner and the wall of the cartridge with a groove 70 for receiving a O-ring 71 or the like sealing means. Such a sealing system for pistons may be used for all kind of pistons moving in a cylinder and is not limited to a cartridge system having a liner assembly.

As further shown in FIG. 7 a piston sealing cap 77 fits over the end of the liner such that it contains the liner against the piston O-ring seal during transport and storage. When filled, this liner may be pushed backwards, piston first, into a cartridge cylinder until the liner front piece flange 27 rests against the front of the cartridge cylinder.

In all above disclosed embodiments it is possible to unite the two outlet pieces in one singular outlet piece.

Figure 9:
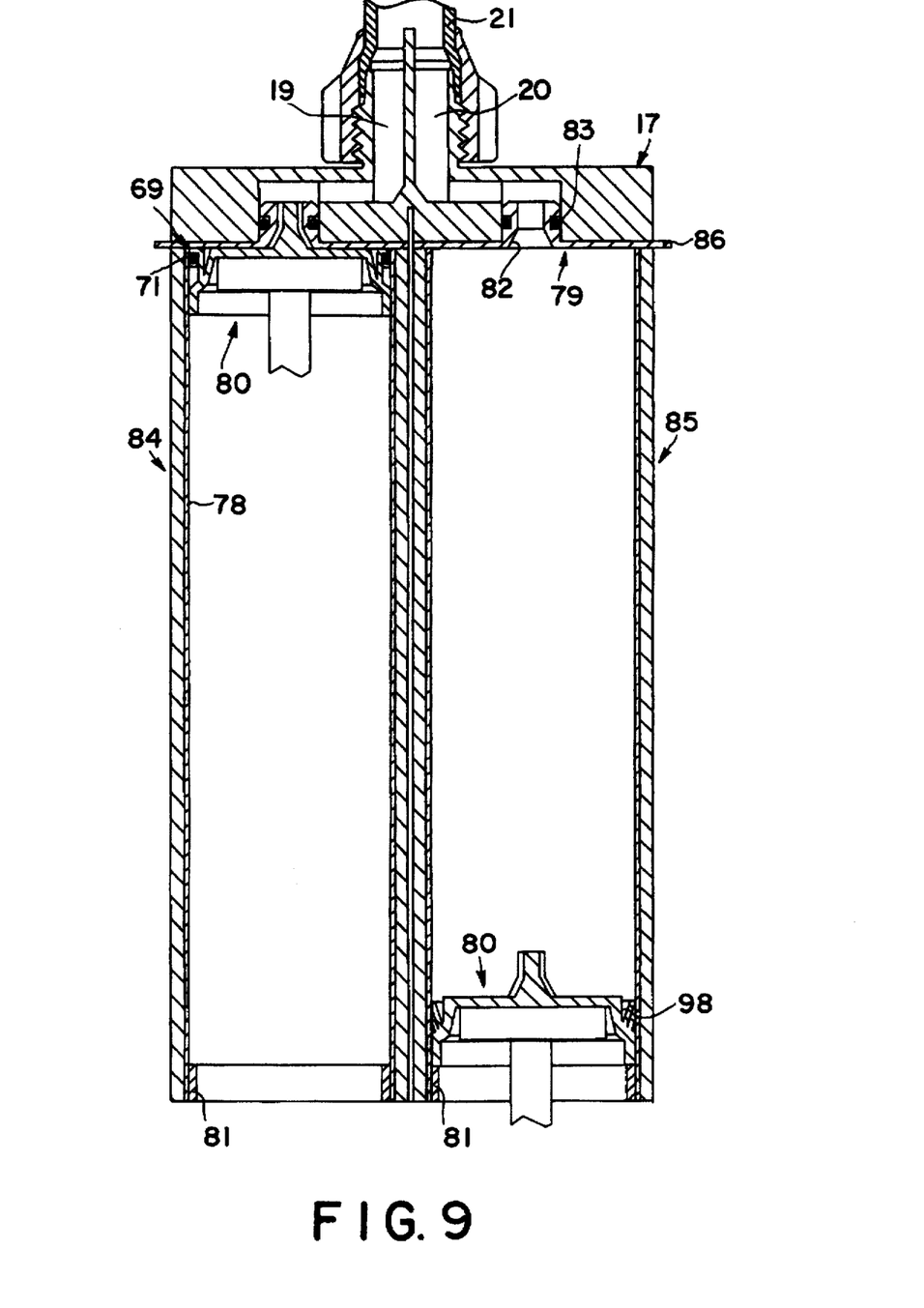
FIG. 9 shows a further embodiment of the invention.

A further embodiment of the invention is shown in FIG. 9 which comprises a plastic moulded, blow moulded or metal impact formed or deep drawn combination of a thin wall liner and a liner front end, similar to a toothpaste tube, whereby the liner and the liner outlet end are formed in one piece. Front piece 17 and the parts of it are the same as in the previous embodiments. Liner 78 and its outlet end 79 are made in one piece. At the inlet end of the liner, piston 80, which is similar to piston 67 of the previous embodiment, is secured by a similar retaining ring 81 and can be provided, for transport, with a transport cap if required. The pistons may also be provided with a double lip 98 as sealing means. The free ends of the lips are directed to the outlet end of the container for efficient sealing. The outlet 82 of the outlet assembly may be provided with sealing means 83.

When filled, these liners also may be pushed backwards, piston first, into the cartridge cylinders 84 and 85 until the outlet end flange 86 rests against the front of the cartridge cylinders, whereupon cartridge front piece 17 is pushed onto the assembly.

It might be preferable, for security reasons and for all embodiments, to secure the cartridge front piece 17 to the cartridge cylinder by known per se snap-in means. It is also possible within the scope of this invention, in particular for small cartridges, to form the front piece of the cartridge and the outlet assembly in one piece, this part being thus disposable.

Figure 10:
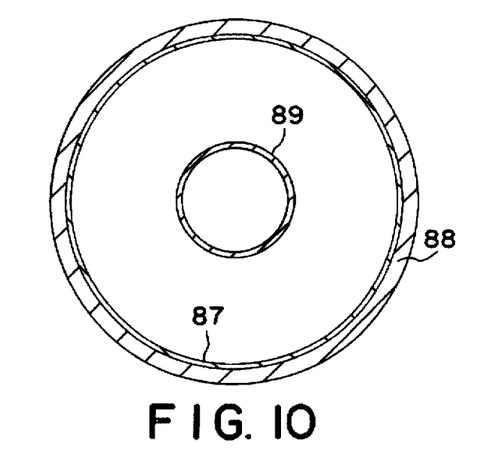
FIG. 10 shows schematically in a section a further embodiment with a concentric arrangement of a two-component system.
Figure 11:
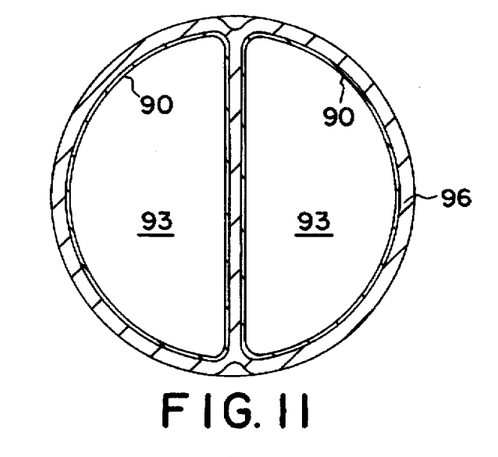
FIG. 11 shows schematically in a section a further embodiment with a segmental arrangement of a two-component system in a one to one proportion.
Figure 12:
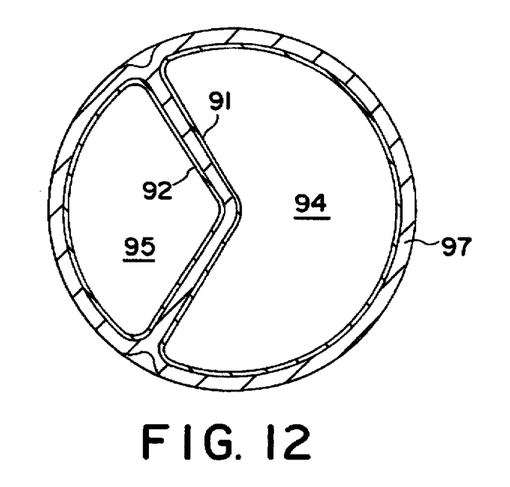
FIG. 12 shows schematically in a section a further embodiment with a segmental arrangement of a two-component system in another than one to one proportion.

FIGS. 10–12 show variants to the side-by-side arrangements disclosed in the previous Figures. The other parts which are not shown, like front or outlet pieces, pistons and the like are similar to the previous embodiments.

FIG. 10 shows an alternative arrangement for two or more liquid systems whereby the liner 87 lines the wall 88 of the cylinder, down which a piston, not shown, passes and compacts a central plastic or plastic/foil laminate tube 89 which is held under internal tension by higher liquid back pressure.

FIGS. 11 and 12 show alternative liner arrangements 90, 91, and 92 where segment shaped pistons, not shown, move within liners within segments 93 and, 94 and 95 of respective cylinders 96 and 97.

I claim:

1. A cartridge for dispensing at least one component, comprising:
   a cartridge having a rigid cartridge wall
   a content package having a liner which has an outlet end and an inlet end disposed in said rigid cartridge wall, and
   a piston assembly having a piston body,
   wherein said liner is fastened at said outlet end to an outlet assembly,
   wherein said liner is fastened at said inlet end to a rear portion of said piston body such that said piston body is disposed inside said liner.

2. A cartridge according to claim 1, wherein said outlet assembly is attached to a front piece of said cartridge.

3. A cartridge according to claim 1, wherein said inlet end of the liner is fastened to said piston body such that a sealing means disposed on said piston body is inside said liner,
   said sealing means being in contact with an inner surface of said liner to create a seal between said piston body and said inner surface of said liner.

4. A cartridge according to claim 1, wherein said outlet end of the liner is fastened to a ring inserted into the cartridge before the piston body.

5. A cartridge according to claim 2, wherein said outlet assembly for the liner comprises an outlet piece and a securing piece for securing said liner, said outlet assembly being removably attached to the front piece of the cartridge.

6. A cartridge according to claim 5, wherein said liner is fastened to the outlet piece by welding, hot sealing or bonding.

7. A cartridge according to claim 5, wherein said outlet assembly comprises sealing means.

8. A cartridge according to claim 1, wherein said liner is made of thin film plastic, or plastic or foil laminate, with a welded, hot sealed or glued seam on its longitudinal side.

9. A cartridge according to claim 1, wherein said liner is made from injection moulded or blow moulded plastic material, or from extruded metal.

10. A cartridge according to claim 1 wherein said liner and said outlet assembly are integrally formed.

11. A cartridge according to claim 10, wherein said liner is made from injection moulded or blow moulded plastic material, or from impact formed or deep drawn metal.

12. A cartridge according to claim 1, wherein said piston body comprises sealing means.

13. A cartridge according to claim 1, wherein said piston comprises venting means.

14. A cartridge according to claim 1, wherein said piston body has a pull cord attached thereto for pulling said package containing said at least one component through the cartridge to load said package in said cartridge.

15. A cartridge according to claim 1, wherein said piston body comprises a nose which fits within an outlet of said outlet assembly for complete discharge of said at least one component wherein channels are formed in said nose or said outlet of said outlet assembly.

16. A cartridge according to claim 1, wherein the wall of the cartridge is provided with a means for securing the outlet assembly.

17. A cartridge according to claim 2, wherein said cartridge is provided with means for securing said front piece to said cartridge.

18. A cartridge as claimed in claim 1, wherein said piston body comprises sealing means, said sealing means comprising a groove with a sealing ring disposed therein to create a seal between said piston body and said liner.

19. A cartridge as claimed in claim 1, wherein said piston body comprises sealing means, said sealing means comprising a lip for creating a seal between said piston body and said liner.

20. A cartridge according to claim 1,
wherein said liner is divided into a plurality of compartments, wherein said compartments have relative sizes which correspond to a predetermined ratio of said components in said mix.

21. A cartridge as claimed in claim 20, wherein said compartments have different crosssectional areas.

22. A cartridge system for dispensing a mix of components, comprising:
- a plurality of cartridges each containing a different component, wherein said cartridges have relative sizes which correspond to a predetermined ratio of said components in said mix;
- a content package disposed in each of said cartridges, each package having a liner which has an outlet end and an inlet end,
- a plurality of outlet assemblies each of which is attached to one of said liners at said outlet end for outputting said components,
- a front piece for receiving said plurality of outlet assemblies and providing means for mixing said components in said predetermined ratio,
- a plurality of piston assemblies corresponding to said plurality of cartridges, each piston assembly having a piston body,
- wherein, at said inlet end, each said liner is fastened to a rear portion of one of said piston bodies such that said piston body is disposed inside said liner.

23. A cartridge as claimed in claim 19, wherein said lip comprises a double lip having ends which are directed to said outlet end of said content package.

* * * * *

UNITED STATES PATENT AND TRADEMARK OFFICE
CERTIFICATE OF CORRECTION

PATENT NO. : 5,667,102
DATED : Sep. 16, 1997
INVENTOR(S) : Wilhelm A. Keller

It is certified that error appears in the above-identified patent and that said Letters Patent is hereby corrected as shown below:

Please delete drawing sheet 5 of 6 and substitute drawing sheet 5 of 6 as per attached.

Signed and Sealed this

Twenty-fourth Day of November, 1998

Attest:

BRUCE LEHMAN

Attesting Officer     Commissioner of Patents and Trademarks

FIG. 9